United States Patent [19]

Ohtsuka et al.

[11] 4,364,859
[45] Dec. 21, 1982

[54] METHOD FOR PRODUCING OXIDE POWDER

[75] Inventors: Katsuyuki Ohtsuka, Mito; Jin Ohuchi, Tokai; Yoshiharu Takahashi, Katsuta, all of Japan

[73] Assignee: Doryokuro Kakunenryo Kaihatsu Jigyodan, Tokyo, Japan

[21] Appl. No.: 168,144

[22] Filed: Jul. 14, 1980

Related U.S. Application Data

[62] Division of Ser. No. 18,320, Mar. 7, 1979, abandoned.

[30] Foreign Application Priority Data

Mar. 13, 1978 [JP] Japan .................................. 53-28526

[51] Int. Cl.$^3$ .............................................. G21F 9/08
[52] U.S. Cl. .......................... 252/643; 204/157.1 P; 219/10.55 M; 264/0.5; 264/25; 423/251; 423/252; 423/261; 423/15; 501/152; 501/155
[58] Field of Search .............. 252/635, 634, 632, 630, 252/627, 643; 204/157.1 R; 264/25, 0.5; 423/3, 11, 15, 19, 251, 252, 261; 34/1, 4

[56] References Cited

U.S. PATENT DOCUMENTS

| | | | |
|---|---|---|---|
| 3,067,115 | 12/1962 | Clingman | 204/157.1 H |
| 3,846,520 | 11/1974 | Bruijin et al. | 423/261 X |
| 3,862,908 | 1/1975 | Fitch et al. | 423/252 |
| 3,883,441 | 5/1975 | Murphy et al. | 252/301.1 W |
| 4,221,680 | 9/1980 | Hardwick et al. | 34/1 X |
| 4,234,550 | 11/1980 | DeHollander | 423/15 |
| 4,242,220 | 12/1980 | Sato | 264/0.5 X |

FOREIGN PATENT DOCUMENTS

1407978 10/1975 United Kingdom ............... 252/635

Primary Examiner—Helen M. McCarthy
Attorney, Agent, or Firm—Wenderoth, Lind & Ponack

[57] ABSTRACT

A method for the heat treatment of a radioactive substance by microwave power comprising preparing a nitrate solution of uranium, thorium, plutonium or a mixture thereof, and applying to the nitrate solution microwave energy sufficient to directly convert the nitrate solution into an oxide powder of uranium, thorium, plutonium or a mixture thereof, respectively. Such oxide powder is suitable for the manufacture of nuclear fuel pellets.

9 Claims, 1 Drawing Figure

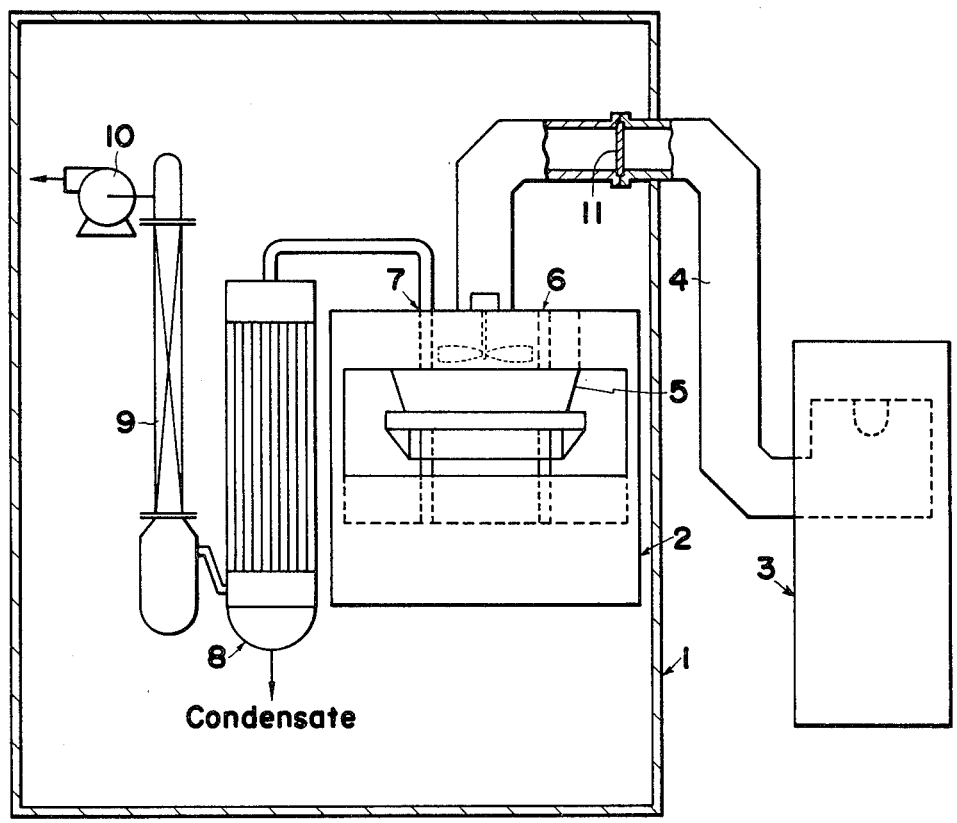
Condensate

METHOD FOR PRODUCING OXIDE POWDER

This is a division of application Ser. No. 18,320, filed Mar. 7, 1979, now abandoned.

BACKGROUND OF THE INVENTION

The present invention relates to a process for heat treatment of a radioactive substance by microwave power and more particularly, to a heat treatment process for the production of oxide powders suitable for the manufacture of nuclear fuel pellets.

Typical conventional methods of producing oxide powders of uranium, thorium, plutonium or the like substances include a direct denitration method, a sol-gel method, a precipitation method and so forth. These methods have, however, advantages and disadvantages, and are not satisfactory.

The direct denitration method comprises heating nitrate solutions of these substances to convert the nitrate solutions to oxide powders and, according to the type of heating, this method further employs a fluidized bed or heater. In the direct denitration method using a fluidized bed, there are produced hollow particles which are unsuitable for raw materials for fuel pellets of high density. This method has further disadvantages in that a large amount of gas is discharged due to the use of fluidizing gas, that a large-sized apparatus for processing the discharging gas is required, and that additional oxide powders are necessitated as a fluidizing medium and as seeds. On the other hand, according to the direct denitration method using a heater wherein heating is directly carried out by the heater, there is a tendency to heat the particle from the side close to the heater, so that an oxide layer is produced at that side of the particle. Such oxide layer serves as an insulating material and binders further heating of the central portion of the particle. When the heating is further continued to heat the particle up to the central portion, the side of the particle close to the heater is highly heated, resulting in the production of powders of a low activity due to a poor sinterability.

The sol-gel method comprises, in the case where uranium oxide, for example, is produced, adding hexamethylenetetramine to a uranyl nitrate solution, dripping the thus obtained solution into paraffin at 95° C. to make sol and gel, and drying it to produce oxide powder. This method presents problems in that it is difficult to define and control conditions for producing oxide powder having a desired particle size, and that fuel pellets made of the thus obtained powder provide a larger degree of swelling.

The precipitation method consists of preparing a nitrate solution of uranium, thorium, plutonium or the like substances, adding ammonia to the solution so as to cause precipitation of hydroxides, subjecting the precipitate to solid-liquid separation, drying the separated solid and effecting roast-reduction of the dried solid. This precipitation method is most preferred because it can provide powders of a high activity due to good sinterability, as well as a smaller swelling of the pellet. This method, however, requires a large number of steps such as solid-liquid separation, drying, roast-reduction and so on as stated before, resulting inevitably in enlargement and complication of the production equipment, as well as an increase of the dosage of radioactive rays to which workers are subjected. If remote control and automation of the process are adopted for reducing the dosage to the workers, the equipment is inconveniently rendered further complicated. During maintenance of such highly complicated equipment, the chance of increased dosage will be increased.

Namely, since the substance to be treated is radioactive, the process must be executed under a specific management, and the substance must be handled in a cell or globe box of gas-tight construction having a specific evacuation system. The simplification and improved durability of the processing equipment are essential particularly in this case, because the control and protective maintenance of the equipment are made indirectly. The reduced number of process units is preferred also from the view points of decrease of dosage to workers and reduction of generation of radioactive byproducts which are to be disposed.

SUMMARY OF THE INVENTION

An object of the present invention is to provide a method for heat treatment of radioactive substances.

Another object of the present invention is to provide a heating process making use of microwave power, suitable for use in the production of oxide powders for nuclear fuel pellets having a high activity.

In carrying out the process of the present invention, there may be employed an apparatus for heat treatment of a radioactive substance by using microwave power, which comprises a shield box, a microwave power application chamber disposed in the shield box, a microwave power generator disposed at the outside of the shield box, and a waveguide tube extending through the wall of the shield box between the microwave power generator and the microwave power application chamber.

The microwave power application chamber is provided with a passage for the supply of the radioactive substances to be treated and/or a passage for discharging volatile substances released from the radioactive substances under heat treatment.

Preferably, the waveguide tube is closed internally by means of a wave guiding material which prevents substances from moving from the microwave power application chamber to the microwave power generator.

According to the invention, there is provided a method for producing oxide powder suitable for the manufacture of nuclear fuel pellets, which method comprises preparing a nitrate solution of uranium, thorium, plutonium or the like substance, and applying microwave power to the nitrate solution to directly convert the nitrate solution to oxide powder, without necessitating any adjustment of the concentration of the nitrate solution and without taking the step of solid-liquid separation. It is also possible to directly convert a mixture of two or three of the above-mentioned nitrate solutions to a powder mixture of their oxides.

BRIEF DESCRIPTION OF THE DRAWING

The present invention will become apparent from the following detailed description and the accompanying drawing which shows schematically an apparatus for carrying out a heat treatment method in accordance with an embodiment of the invention.

DETAILED DESCRIPTION OF THE INVENTION

Referring to the drawing, an apparatus for performing the process of the present invention has a shield box 1 which may be a globe box or a cell, in which a microwave power application chamber 2 is disposed. A microwave power generator 3 is positioned at the outside of the shield box 1. The microwave power application chamber 2 and the microwave power generator 3 are connected to each other by means of a waveguide tube 4 which extends through the wall of the shield box 1. The microwave power application chamber 2 accommodates a heating vessel 5 provided with a port 6 for the supply of radioactive substance to be treated and a gas discharging port 7 which is connected, through a pipe, to a condenser 8. The condenser 8 in turn communicates with an exhaust blower 10, through a gas scrubber 9. A shielding plate 11 is disposed in the waveguide tube 4 by which the microwave power application chamber 2 and the microwave power generator 3 are connected to each other. The shielding plate 11 is made of a material having a good wave guiding nature and a high corrosion resistance, e.g. fluorine-contained resin, silicone resin, glass, ceramics and so forth, and is adapted to prevent the radioactive substance and corroding gas in the chamber 2 from being transferred and diffused into the microwave power generator 3, although it permits the electromagnetic wave coming from the generator 3 to pass therethrough.

In operation, a solution or slurry containing uranium, thorium, plutonium or the like radioactive substance is introduced into the heating vessel 5 through the supply port 6. Then an electromagnetic wave of a microwave power generated by the microwave power generator 3 is applied to the solution or slurry, so as to heat the latter. The gas released from the solution or slurry as a result of the heating is discharged through the discharging port 7 into the condenser 8 in which the condensate is separated from the gas. The gas is then scrubbed in the scrubber 9, and is exhausted by means of the exhaust blower 10. The powders formed in the heating vessel 5 can be extracted continuously or batchwise. The microwave power heating utilized in the present invention is of the so-called internal heating method in which the substances to be heated themselves generate the heat. Therefore, the heating is not affected by heat conductivity, so that no temperature gradient is formed. As a result, this heating method inherently affords a homogeneous heating at a high efficiency of utilization of energy, which in turn permits a roast-reduction at a low temperature, so as to ensure a high sinterability of the oxide powders for fuel pellets.

The following and other advantages are offered by the microwave power heat treating method of this invention:

(1) It is possible to directly convert uranyl nitrate solution into uranium oxide.

(2) It is possible to directly convert plutonium nitrate solution into plutonium dioxide.

(3) It is possible to directly convert thorium nitrate solution into thorium dioxide.

(4) A liquid mixture of two or three of the above-mentioned solutions can be directly converted into oxides of such mixture.

(5) Hydroxides are precipitated by respectively adding ammonia to the above-mentioned four nitrate solutions. These precipitates can be directly converted into oxide powders by the heating operation, without necessitating the step of filtration.

(6) Plutonium oxalate and thorium oxalate are precipitated by adding oxalic acid to plutonium nitrate solution and thorium nitrate solution, respectively. These precipitates can be directly converted into plutonium dioxide and thorium dioxide, respectively, by the heating operation without necessitating the step of filtration.

(7) Thorium carbonate is precipitated by adding ammonium carbonate to the thorium nitrate solution. This thorium carbonate can be directly converted into thorium dioxide by the heating operation, without necessitating the step of filtration.

(8) Waste liquid or slurry containing uranium, thorium, plutonium, and other transuranium elements, as well as fission products, can be directly dried or calcined.

More specifically, the use of powders of high activity (highly dense spherical powders of small particle size) is essential for the production of highly dense oxide pellets of uranium, thorium or plutonium. In contrast to the above, the use of highly active powders is not essential in the production of pellets of low density. However, the pellets produced without using highly active powders have an impractically low density of the matrix as a whole, often resulting in a densification or the like unfavourable phenomena. Such pellets are not suitable for use as fuel pellets. Therefore, the powders of high activity are used also in the production of pellets of low density. Namely, a density lowering agent such as polyethylene is added to the powders of high activity, and the powders are molded together with this agent. The density lowering agent is evaporated during sintering, so that pores may be uniformly distributed in the pellet so as to lower the density of the produced pellet. It is therefore essential to use powders of high density, but also in the production of pellets of low density as well. The process of the invention is particularly useful for the production of such powders of high activity.

Practical examples of the use of the process with reference to the drawing will be described hereinunder.

EXAMPLE 1

0.2 l of uranyl nitrate solution having a uranium concentration of 500 g/l was put in a vessel made of a ceramic. Then, a microwave power of 2450 MHz and 480 W power was applied to the solution for 45 minutes, so as to reduce the latter into blocks and powders. These blocks and powders were removed from the apparatus and were roasted at 700° C. for two hours in a separate roaster and were then treated for four hours in a hydrogen reducing atmosphere at 720° C. The resulting uranium dioxide was then processed in a mortar, and was molded at a molding pressure of 2 ton/cm$^2$. The molded uranium dioxide powders were finally sintered at 1650° C., so as to become a uranium dioxide pellet having a density of 93.0% of the theoretical density.

EXAMPLE 2

1 l of uranyl nitrate solution containing 280 g/l of uranium was put in a vessel made of a ceramic. The solution was reduced into blocks and powders by the application of a microwave power of 2450 MHz and 1.5 KW power for two hours. After roasting at 700° C. for two hours in a separate roaster, the blocks and powders were treated in a hydrogen reducing atmosphere at 720° C. The resulting uranium dioxide was processed for five hours in a ball mill and then molded at a molding pressure of 2 ton/cm$^2$. Finally, the molded uranium dioxide powders were sintered at 1650° C., so as to become a uranium dioxide pellet having a density of 96% of the theoretical density.

EXAMPLE 3

Ammonia was added to 0.2 l of uranyl nitrate solution containing 500 g/l of uranium, so as to cause a precipitation of ammonium diuranate. The precipitate was then put in a vessel made of a ceramic, without being subjected to solid-liquid separation. Subsequently, a microwave power of 2450 MHz and 480 W power was applied to the precipitate in the vessel for 45 minutes, and a pellet of uranium dioxide was produced in the same way as Example 1. This pellet had a density of 92% of the theoretical density, and no extraordinariness of appearance was found.

EXAMPLE 4

80 ml (116 g) of slurry containing ammonium nitrate, iron hydroxide, aluminum hydroxide and tri-iron tetraoxide was prepared as a simulative sample of slurry produced in a plutonium waste liquid disposal process. 7 g of oxide powders were obtained, as a result of application of a microwave power of 2450 MHz and 480 W power for 18 minutes.

The apparatus for carrying out the process of the invention and having the construction hereinbefore described has a large treating capacity for its reduced size. For instance, by using such apparatus in place of a conventional apparatus for carrying out the process including solid-liquid separation, drying and roasting, the space required for the globe box can be reduced to 1/6, while the treating capacity is increased by five times. Thus, the installation space of the apparatus as a whole can be reduced to 1/30. In addition, such apparatus has a highly simplified construction within the shield box, is quite easy to maintain, and requires less frequent maintenance work. Owing to these features, such apparatus can be used quite suitably in the heat treatment of radioactive substances. In addition, such apparatus can advantageously be used particularly in the production of oxide powders for fuel pellets, because the use of the apparatus affords production of highly dense spherical powders of small particle size by a simplified process. Further, the apparatus can effectively be used in the solidification treatment of waste liquid containing transuranium elements and fission products.

We claim:

1. A method for producing oxide powder suitable for the manufacture of nuclear fuel pellets, said method comprising:
   preparing a nitrate solution of uranium, thorium, plutonium or a mixture thereof; and
   applying to a substance consisting essentially of said nitrate solution microwave energy sufficient to directly convert said nitrate solution into a product consisting essentially of oxide powder of uranium, thorium, plutonium or a mixture thereof, respectively, suitable for the manufacture of nuclear fuel pellets.

2. A method as claimed in claim 1, wherein said step of applying is carried out without adjusting the concentration of said nitrate solution and without any solid-liquid separation operation.

3. A method as claimed in claims 1 or 2, wherein said step of applying comprises positioning said nitrate solution within a heating vessel positioned within a microwave power application chamber, and supplying said microwave energy to said nitrate solution within said heating vessel.

4. A method as claimed in claim 3, wherein said step of positioning comprises supplying said nitrate solution to said heating vessel through a supply port.

5. A method as claimed in claim 4, wherein during application of said microwave energy to said nitrate solution gas is released from said nitrate solution, and further comprising discharging said gas from said microwave power application chamber through an outlet port.

6. A method as claimed in claim 5, further comprising positioning said microwave power application chamber within a shield box formed of a material capable of preventing the escape therefrom of radioactive rays, and removing condensate from said discharged gas within said shield box.

7. A method as claimed in claim 6, further comprising scrubbing the thus-condensed gas, and then exhausting the thus-scrubbed gas from said shield box.

8. A method as claimed in claim 3, wherein said step of supplying comprises conveying said microwave energy to said heating vessel through a wave guide.

9. A method as claimed in claim 8, further comprising positioning within said wave guide a shield plate and thereby preventing the passage therethrough of radioactive material.

* * * * *